United States Patent
Durall

(10) Patent No.: US 9,180,755 B2
(45) Date of Patent: Nov. 10, 2015

(54) SERVICE PORT ADAPTER DEVICE

(71) Applicant: Ronie Dale Durall, Belle Chasse, LA (US)

(72) Inventor: Ronie Dale Durall, Belle Chasse, LA (US)

( * ) Notice: Subject to any disclaimer, the term of this patent is extended or adjusted under 35 U.S.C. 154(b) by 192 days.

(21) Appl. No.: 13/901,451

(22) Filed: May 23, 2013

(65) Prior Publication Data
US 2014/0345122 A1    Nov. 27, 2014

Related U.S. Application Data

(60) Provisional application No. 61/651,351, filed on May 24, 2012.

(51) Int. Cl.
*F24F 13/00* (2006.01)
*B60H 1/00* (2006.01)

(52) U.S. Cl.
CPC ........ *B60H 1/00978* (2013.01); *B60H 1/00585* (2013.01); *Y10T 29/53113* (2015.01)

(58) Field of Classification Search
CPC .............. F25B 2345/006; F25B 45/00; F25B 2500/06; F24F 13/00; Y10T 29/53113
USPC .............. 29/726; 62/299; 137/15.04, 614.05; 251/148; 403/36, 37
See application file for complete search history.

(56) References Cited

U.S. PATENT DOCUMENTS

| | | | | |
|---|---|---|---|---|
| 3,574,314 | A * | 4/1971 | Quercia | 141/349 |
| 5,450,875 | A * | 9/1995 | Chichester et al. | 137/614.05 |
| 6,009,902 | A * | 1/2000 | Troiani et al. | 137/614.19 |
| 6,089,032 | A * | 7/2000 | Trachtenberg | 62/149 |
| 6,230,737 | B1 * | 5/2001 | Notaro et al. | 137/329.4 |
| 6,848,670 | B2 * | 2/2005 | Haunhorst et al. | 251/149.6 |
| 8,272,228 | B2 * | 9/2012 | Murray et al. | 62/149 |
| 2010/0327575 | A1 * | 12/2010 | Blanchard et al. | 285/34 |
| 2011/0041522 | A1 * | 2/2011 | Carrubba | 62/77 |

OTHER PUBLICATIONS

R134a Service Port Adapter. Retrieved from the internet <URL: http://www.autoparts2020.com/rsdev/part_detail.jsp?PART_HDR_ID=18351>.*
Factory Air OEM R134a High Side Service Port Adapter. Published Jul. 29, 2010. Retrieved from the internet <URL: http://shop.advanceautoparts.com/p/factory-air-oem-r134a-high-side-service-port-adapter-59972/18892839- p&nAID=11138?cm_mmc=aff-__-cj-__-1609763-__-10711125&SID=tfc_-_15_715_150225_478630846e7b27d303379d5669151d0a%3A0000#fragment-3>.*
FJC Air Conditioning Products—R134a Service Port Adapter—Straight High 2 piece GM (2606). FJC—Published Jul. 7, 2004. Retrieved from the internet <URL: http://www.amazon.com/FJC-Air-Conditioning-Products-Straight/dp/B000UNM37A>.*
FJC 2607 OE R134a Service Port LS. Retrieved from the internet <URL: http://www.americastoolwarehouse.com/automotive-tools/FJC-2607.html>.*

* cited by examiner

*Primary Examiner* — Joshua Kennedy

(57) ABSTRACT

An adapter device with a PTFE gasket that stops vehicle air conditioning system leaks on most R134a refrigerant non-serviceable air conditioning hoses. The adapter device makes the hose serviceable by replacing the damage non-serviceable service port with a new serviceable service port and valve.

1 Claim, 3 Drawing Sheets

SERVICE PORT ADAPTER DEVICE

CROSS-REFERENCE TO RELATED APPLICATIONS

This application claims priority to U.S. Provisional Application No. 61/651,351, filed May 24, 2012, the entirety of which is incorporated herein by reference.

REFERENCE TO SEQUENCE LISTING, A TABLE, OR A COMPUTER PROGRAM LISTING COMPACT DISC APPENDIX

Not Applicable

BACKGROUND OF THE INVENTION

Age, heat, and sometimes the tool used to charge a vehicle's air-conditioning system with refrigerant damage the air-conditioning unit's service port valves, which are located inside connecting hoses. When the service port valves are damaged, the unit leaks refrigerant. This reduces or ends the air-conditioning unit's ability to blow cold air; and causes the refrigerant to be released into the atmosphere.

Many of the R134a refrigerant vehicle hoses have non-serviceable valves. Thus, replacing a damaged service port valve requires replacement of the entire hose and completely recharging the air-conditioning system with refrigerant, which is expensive. With the present invention, non-serviceable hose replacement is not required to replace a damaged service port valve nor is a complete system recharge. With the present invention, individuals with a minimum of mechanical skills can repair their R134a refrigerant service port leak without paying a repair shop hundreds of dollars. Likewise, auto repair shops making the repairs will save their customers substantial money because of the cost differential between the invention and new non-serviceable hoses and the cost of refrigerant for a complete recharge.

BRIEF SUMMARY OF THE INVENTION

For those vehicles with non-serviceable hoses, the invention stops R134a refrigerant from leaking out of the service port air-conditioning line, hose or dryer on vehicle air-conditioning systems without replacing the hoses. The invention makes the hoses serviceable by effectively replacing the damaged non-serviceable service port pneumatic valve with a new serviceable service port adapter and valve.

BRIEF DESCRIPTION OF THE SEVERAL VIEWS OF THE DRAWINGS

The objectives and advantages of my invention are illustrated by the three pages of drawings that show the parts that makeup the complete adapter device and represent the preferred embodiment of my invention.

DETAILED DESCRIPTION OF THE INVENTION

The invention allows a vehicle owner or professional mechanic to repair R134a refrigerant leaks in a vehicle's air-conditioning system without having to replace non-serviceable hoses and completely recharge the air-conditioning system with R134a refrigerant. Because of the cost differential between non-serviceable replacement hoses and R134a refrigerant Freon and the present invention, the invention is an inexpensive alternative solution to repairing refrigerant leaks.

Figure 1:
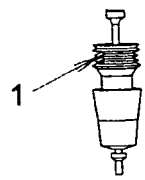
FIG. 1 shows the pneumatic valve for refrigerant
Figure 2:
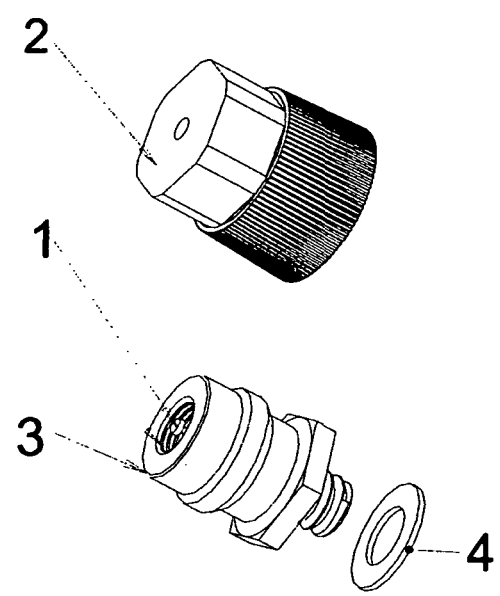
FIG. 2 is an exploded view of the component parts of the High Pressure Side R134a Service Port Aluminum Adapter Device.
Figure 3:
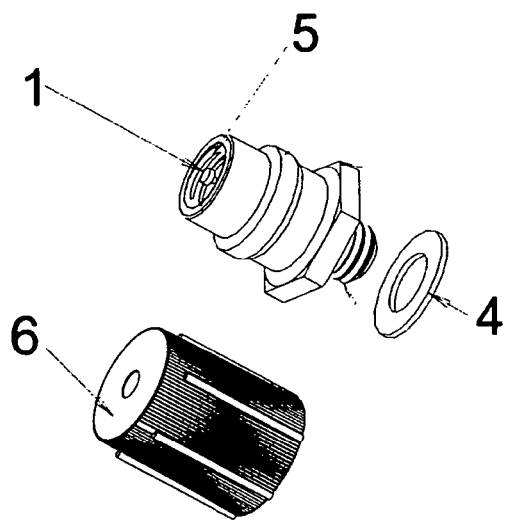
FIG. 3 is an exploded view of the component parts of the Low Pressure Side R134a Service Port Aluminum Adapter Device.

The present invention is made by manufacturing part (3), a High Pressure Side Service Port Adapter Device, illustrated in FIG. 2 and part (5), a Low Pressure Side Service Port Adapter Device, illustrated in FIG. 3, from aluminum hex bars (hex bars are used to enable the adapter devices to be wrenched tight on installation) machined down to the specifications: for part (3), top of device I.D. 8 MM, middle of device O.D. 16 MM and bottom of device O.D. 8 MM and machined down to the specifications for part (5), top of device I.D. 8 MM, middle of device O.D. 13 MM and bottom of device O.D. 8 MM, which specifications are necessary to (1) screw parts (3) and (5) into a vehicle's non-serviceable High and Low Side service ports, (2) accept part (1) illustrated in FIG. 1, the pneumatic valve for refrigerant with a 5.30 mm×0.706 pitch, and (3) accept the Hi-Low quick connect service line for R134a refrigerant.

Part (4) illustrated in FIGS. 2 and 3 is a polytetrafluoroethylene (PTFE) Gasket stamped-out from a sheet of PTFE to specification, 1/32 of an inch thick, to effectuate a seal between the serviceable and non-serviceable ports. Note: Part (1) illustrated in FIG. 1 (the pneumatic valve for refrigerant with a 5.30 mm×0.706 pitch) and part (2) in FIG. 2 (R134A Red Plastic Cap for High Pressure Side) and the part (6) in FIG. 3 (R134a Blue Low Side Cap), are not manufactured by the inventor. Those parts are purchased "off the shelf" for use in the invention.

The preferred embodiment of the invention works was follows:

Parts (3) and (5) illustrated in FIGS. 2 and 3 are the High and Low Side Service Ports Adapter Devices respectively, which act as adapters and the housing for part (1) illustrated in FIG. 1, a pneumatic valve for refrigerant with a 5.30 mm×0.706 pitch. When parts (3) and (5) illustrated in FIGS. 2 and 3 (which each contain part (1) illustrated in FIG. 1) are screwed into the non-serviceable service ports of the vehicle's air-conditioning system, the original leaking pneumatic valve for refrigerant is effectively replaced. Part (4) illustrated in FIGS. 2 and 3, is a PTFE Gasket. When (4) is placed between the High and Low Side Service Ports Adapter Devices and the non-serviceable service ports of the vehicle's air-conditioning system, it acts as a seal between the non-serviceable service ports and the new serviceable service ports, which allows part (1) illustrated in FIG. 1, to prevent the R134a refrigerant from leaking from the vehicle's air-conditioning system.

The preferred embodiment of the invention is assembled and installed as follows:

High Side service port adapter assemblage: Take part (3) illustrated in FIG. 2, the High Side R134a Service Port 16 mm O.D. Aluminum Adapter Device, insert part (1) illustrated in FIG. 1 (the pneumatic valve for refrigerant with a 5.30 mm×0.706 pitch) into part (3), then place part (4), the PTFE Gasket, on the threaded bottom of part (3), attach to Hi Side non-serviceable service port and then screw on part (2) illustrated in FIG. 2, the R134a Red High Side Cap, onto part (3).

Low Side service port assemblage: Take part (5) illustrated in FIG. 3, the Low Side Service Ports Adapter Device, insert part (1) illustrated in FIG. 1 (the pneumatic valve for refrigerant with a 5.30 mm×0.706 pitch) into part (5), then place part (4), the PTFE Gasket, on the threaded bottom of part (5), attach to Low Side non-serviceable service port and charge with refrigerant then screw on part (6) illustrated in FIG. 3, the R134a Blue Low Side Cap, onto the part (5).

Installation of both the invention's low-side and high-side a/c service port adaptors is done as follows: (Note: if one is only installing one of the adaptors use Step 2 for installing the low-side air-conditioning service port adaptor or Step 3 for the high-side adaptor.

STEP ONE: To install the invention, one must first locate and identify the correct a/c service port on the vehicle to attach the appropriate adaptor device. The vehicle's low-side has a larger line with a smaller service port connecter. The vehicle's high-side has a smaller line with a larger service port connecter.

STEP TWO: Install the invention's low-side a/c service port adaptor: Remove the Blue Cap adapter device, parts (1), (5) and (6), from the package. Install part (4), the white PTFE gasket, onto the threaded end. Then twist the Blue Cap adapter device (small) into the vehicle's low-side service port (large line-small port) It will take a 13 mm wrench to snugly tighten the low-side air-conditioning service port adaptor onto the vehicle's low-side a/c service port.

STEP THREE: Install the high-side air-conditioning service port adaptor: Remove the Red Cap adapter device, parts (1), (3) and (2), from the package. Install part (4), the white PTFE gasket, onto the threaded end. Then twist the Red Cap (large) into the vehicle's high-side service port (small line-large port). It will take a 16 mm wrench to snugly tighten the adapter device high-side air-conditioning service port adaptor onto the vehicle's high-side air-conditioning service port.

STEP FOUR: The a/c system is now ready to be charged with refrigerant as needed through the low-side air-conditioning service port.

I claim:

1. A service port adapter device capable of screwing into non-serviceable high and low side service ports of an air-conditioning line, hose, or dryer for stopping R134a refrigerant from leaking from the service ports, the adapter device comprising:
    a cylindrical bar having
        an axial passage for fluid flow therethrough;
        a first male threaded end for screwing into non-serviceable high and low side service ports;
        a hexagonal outer flange adjacent the first male threaded end;
        an external annular groove adjacent the hexagonal outer portion for accepting a hi-low quick connect service line for R134a refrigerant charging;
        a second female threaded end, the outer diameter of the first male threaded end being the same as the inner diameter of the second female end; and
        an internal thread located between the first and second threaded ends accepting a threaded pressure valve therein.

* * * * *